(12) United States Patent
Oyama

(10) Patent No.: US 6,403,015 B1
(45) Date of Patent: Jun. 11, 2002

(54) PROCESS FOR MOLDING THREE-DIMENSIONAL MOLDED PRODUCT FROM A SHEET

(75) Inventor: Kanji Oyama, Mizunami (JP)

(73) Assignee: KTX Co., Ltd., Konan (JP)

( * ) Notice: Subject to any disclaimer, the term of this patent is extended or adjusted under 35 U.S.C. 154(b) by 0 days.

(21) Appl. No.: 09/471,801

(22) Filed: Dec. 23, 1999

(30) Foreign Application Priority Data

Oct. 27, 1999  (JP) ............................................. 11-305794

(51) Int. Cl.⁷ ................................................. B29C 51/10
(52) U.S. Cl. ........................ 264/553; 264/154; 264/163; 264/322
(58) Field of Search ................................ 264/154, 163, 264/322, 550, 553

(56) References Cited

U.S. PATENT DOCUMENTS 5,728,284 A  3/1998  Oyama
5,894,007 A  * 4/1999  Younessian et al. ..... 264/550 X

FOREIGN PATENT DOCUMENTS

JP  2-14434  4/1990
JP  5-39698  6/1993
JP  5-156486  6/1993

* cited by examiner

*Primary Examiner*—Leo B. Tentoni
(74) *Attorney, Agent, or Firm*—Pillsbury Winthrop LLP

(57) ABSTRACT

The process of the present invention involves molding a 3-D molded product from a sheet. The molded product includes a product section, which turns out to be a product, and an extra product section, which is to be excised. The sheet is made of a thermoplastic polymeric material. The process includes clamping the sheet at its peripheral edge; heating and softening the sheet; deforming the heated and softened sheet by stretching the sheet along a 3-D molding surface of a mold; and adhering the sheet to the 3-D molding surface to mold the 3-D molded product. A thickness of the product section is made up by moving the sheet material at the extra product section to the product section during the deforming step by partially releasing a tensile stress of the extra product section.

4 Claims, 21 Drawing Sheets

F I G. 2
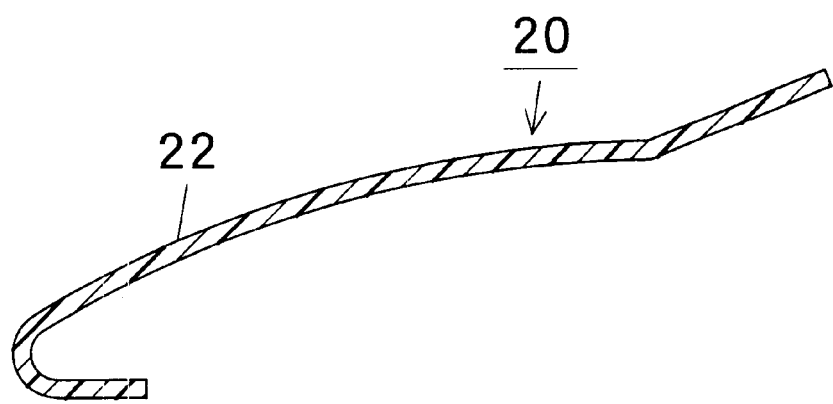

F I G. 6
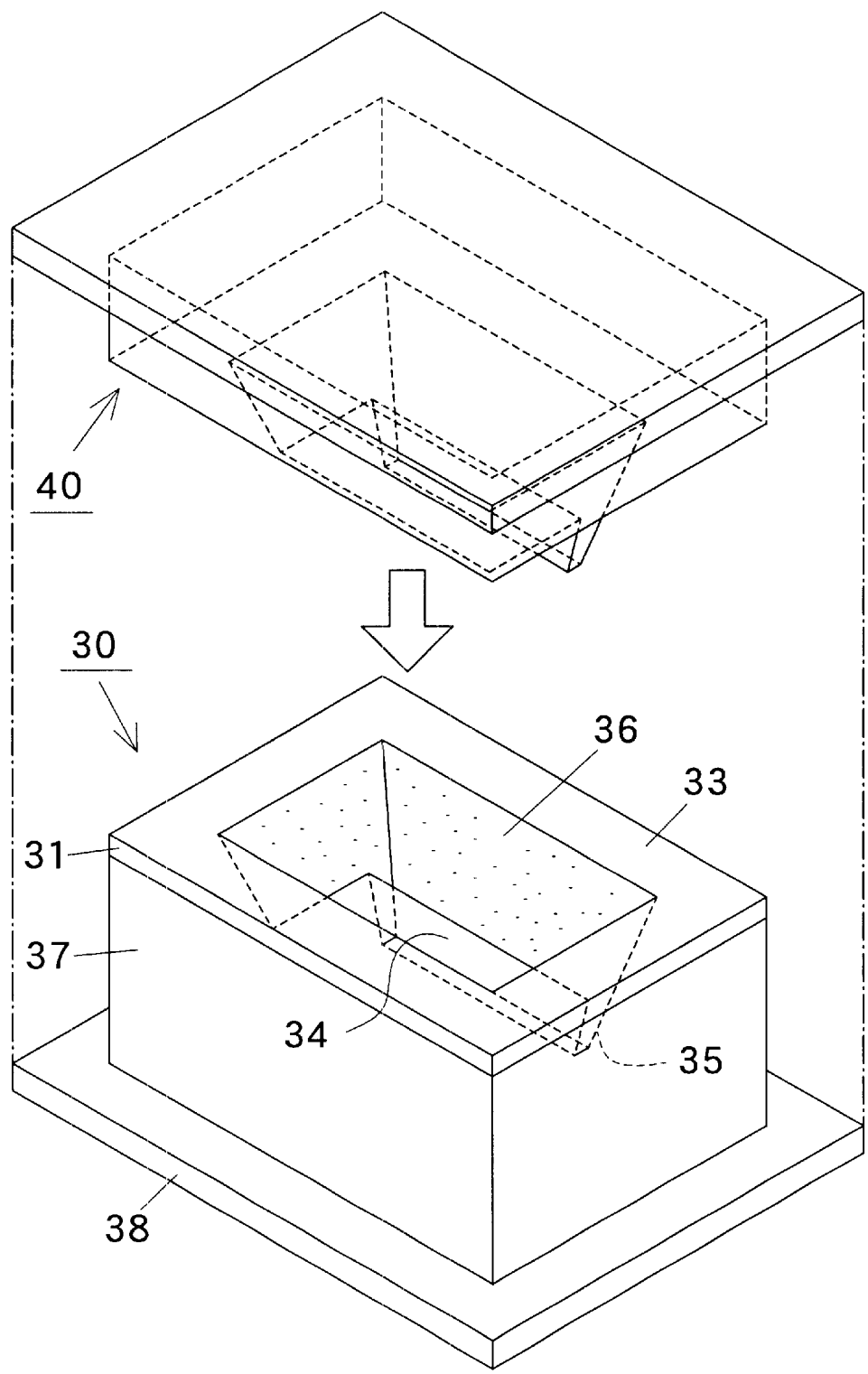

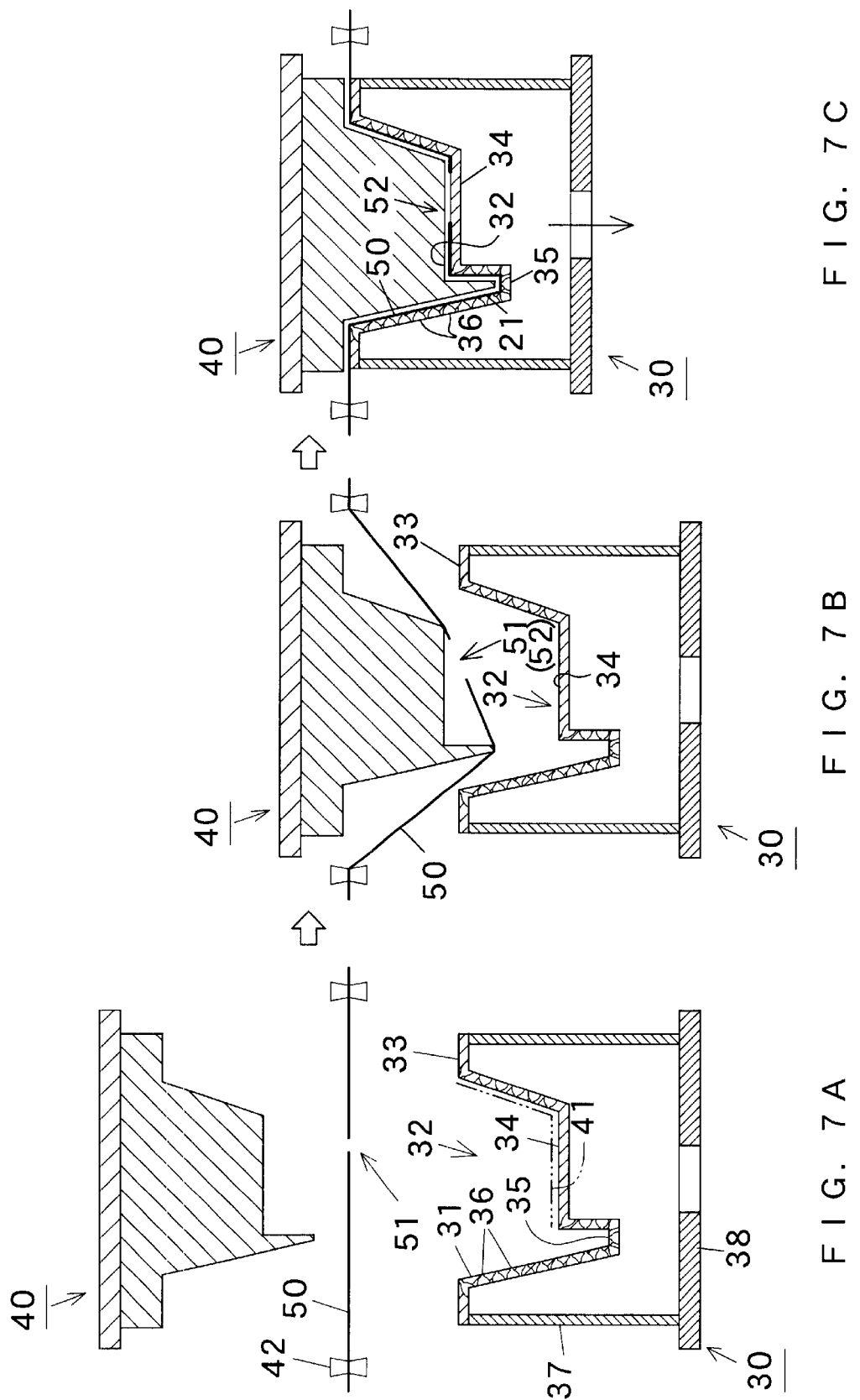

FIG. 8A
FIG. 8B
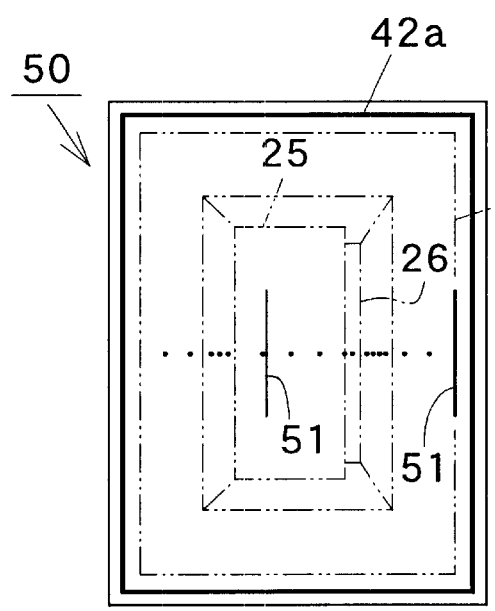
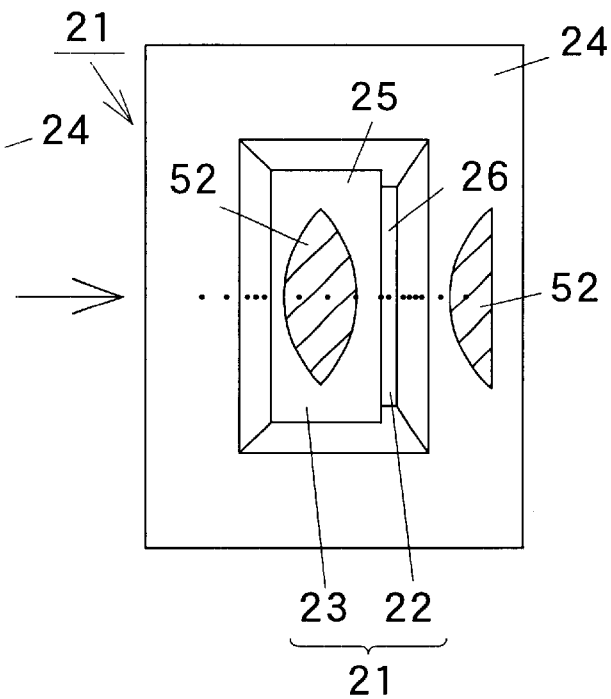

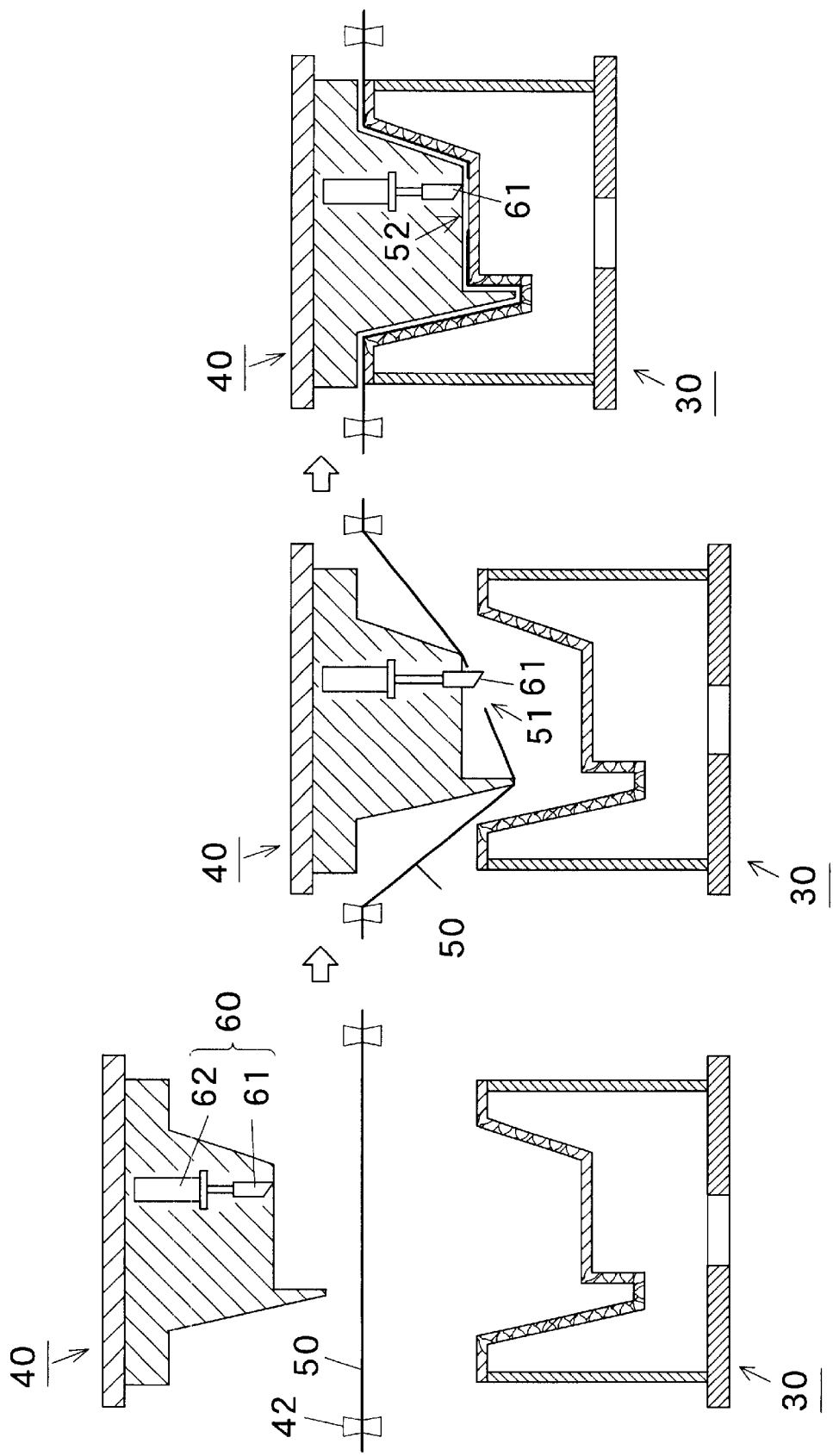

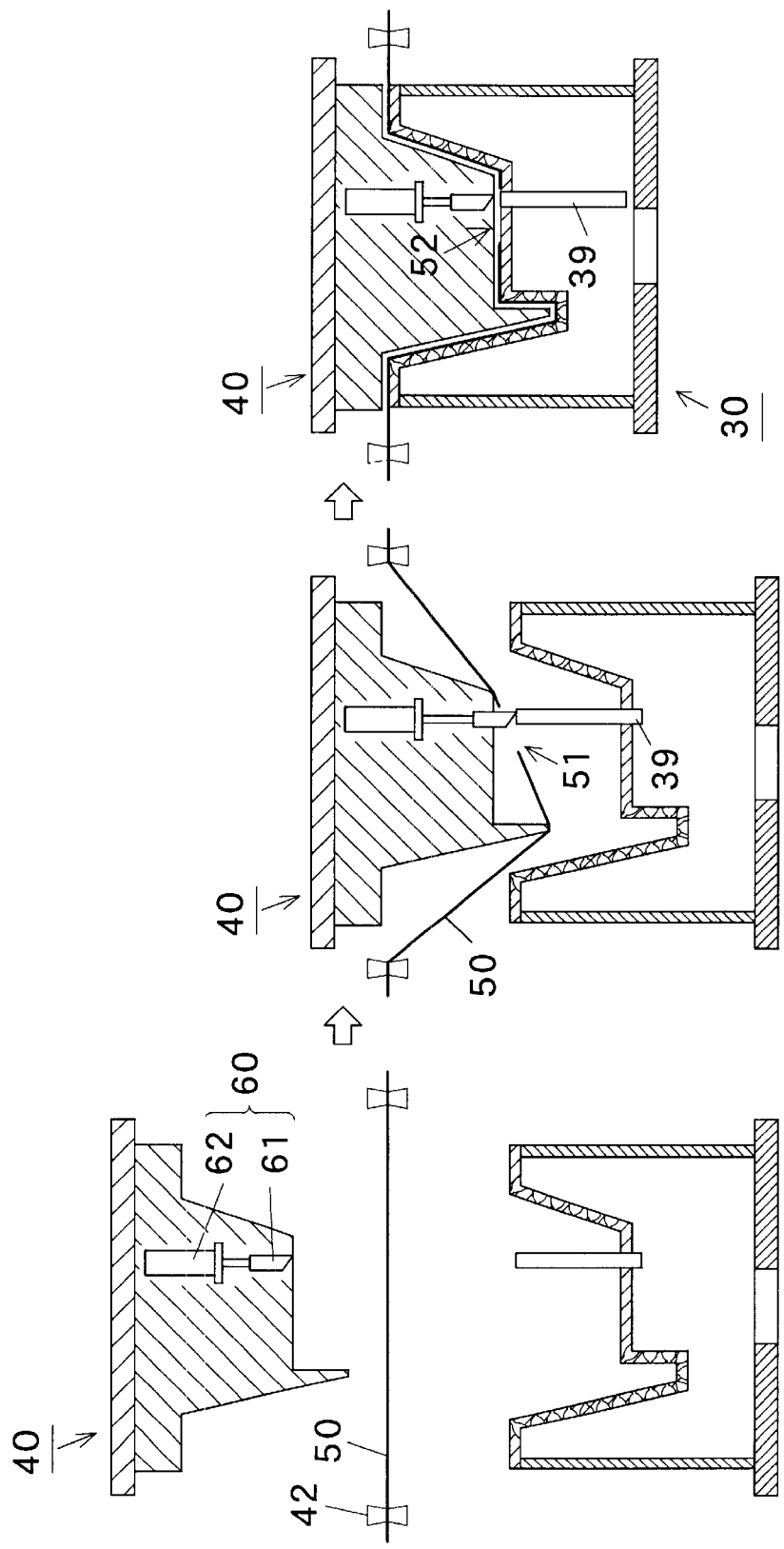

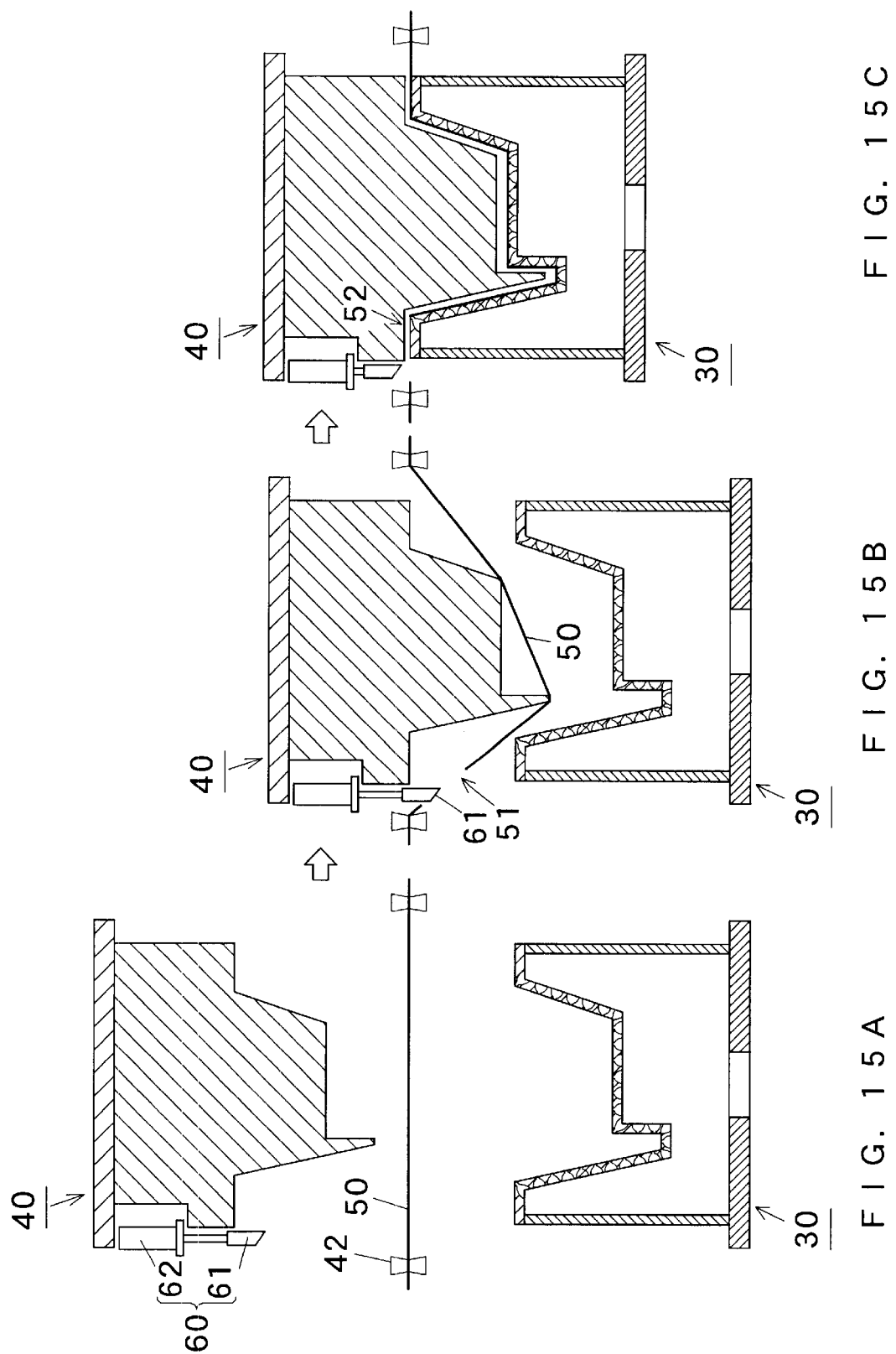

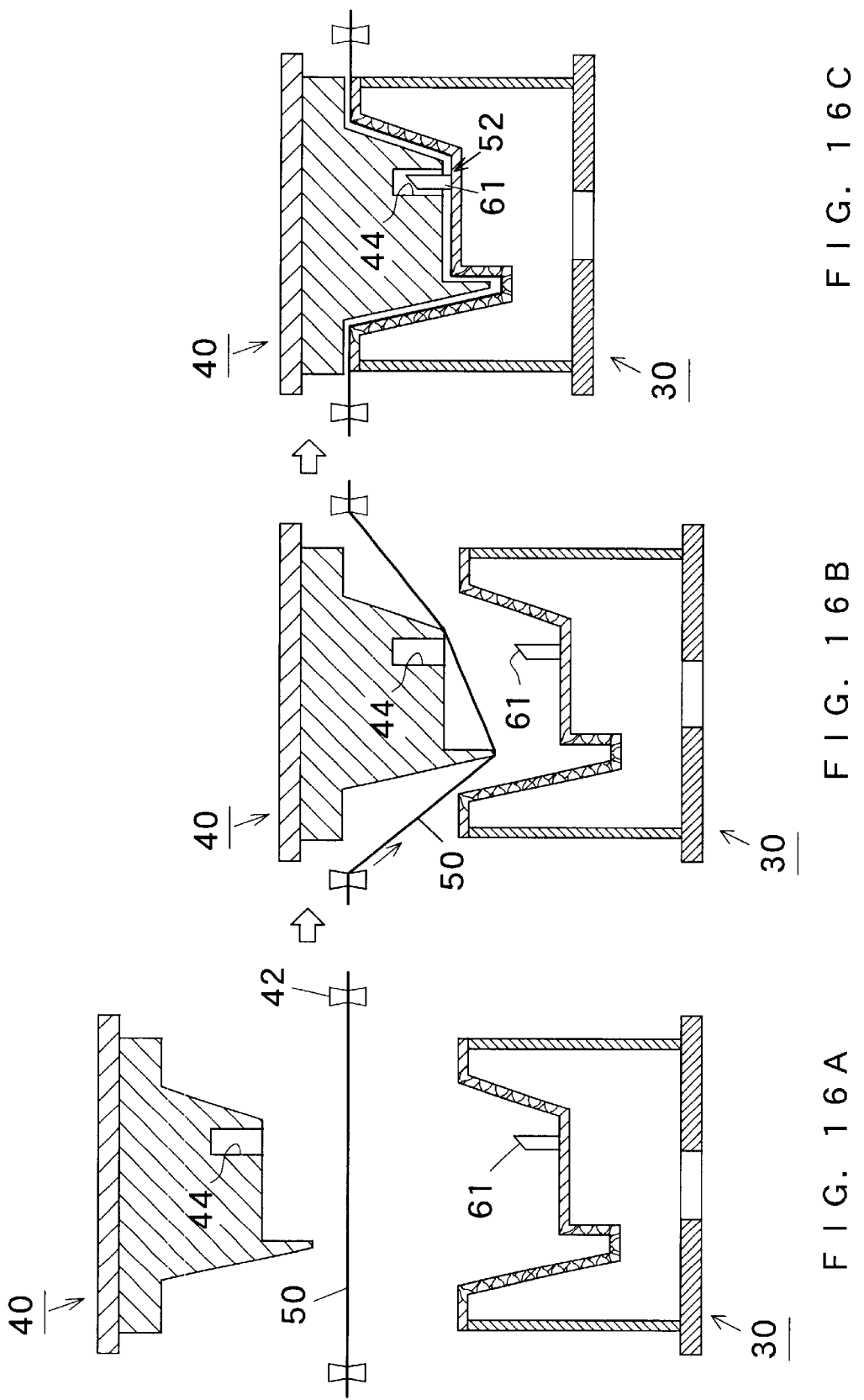

FIG. 18A
FIG. 18B
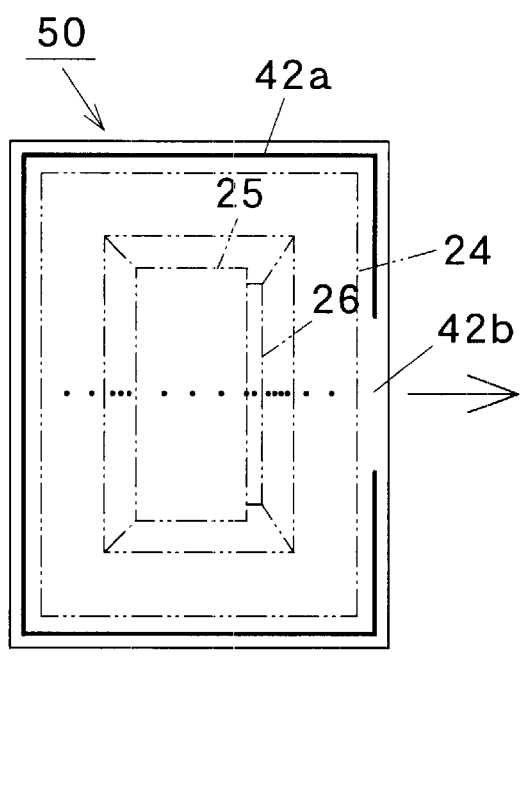
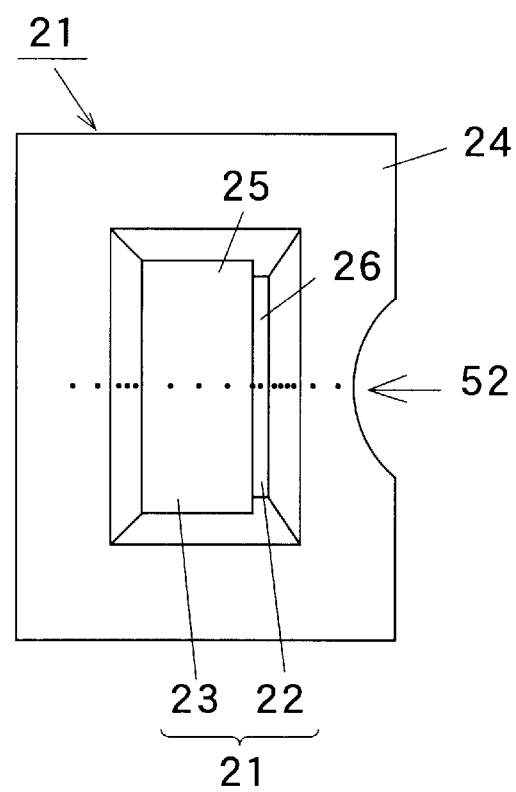

PROCESS FOR MOLDING THREE-DIMENSIONAL MOLDED PRODUCT FROM A SHEET

BACKGROUND OF THE INVENTION

1. Field of the Invention

The present invention relates to a process and an apparatus for molding a 3-D (three-dimensional) molded product from a sheet. More specifically, it relates to a technology for controlling the thickness of the 3-D molded product.

2. Description of Related Art

A skin 100 of an instrument panel, as shown in FIG. 20, is molded by heating and softening a thermo-plastic resin sheet while clamping its peripheral part, by pressing the sheet into a vacuum-mold by a plug so as it to be deformed while elongated, and by adhering the sheet to a 3-D molding surface by vacuuming and suctioning it by the vacuum-mold. A crimp pattern (not shown), which is formed on the 3-D molding surface, is transferred to the surface of the instrument panel skin 100.

Because the sheet is deformed while elongated as described above, the thickness of the skin 100 is thinned in comparison to the thickness of the original sheet. However, as shown in FIG. 21, problematically, the color, feel, strength, and other attributes of a convex top part 101 (the region where the sheet is molded in vacuum by being pressed into a deep concave part of the 3-D molding surface) and its side part 102 of the skin 100 differ from the other parts because the elongation percentage is very large and the skin is very thin there.

Then, in order to suppress the elongation percentage of the convex top part 101 and the side part 102 to assure a certain thickness, the following measures have been taken solely or in combination:

(1) Contrive the shape of the plug;
(2) Adjust a gap between the 3-D molding surface and the plug;
(3) Adjust the slipperiness of the sheet by pasting a tape, cloth, sandpaper and the like on the plug;
(4) Cool the sheet partially by the plug; and
(5) Partially adjust the heating temperature of the sheet.

However, the thickness of the convex top part 101 and the side part 102 has not been assured by the measures described above. Also, it has been impossible to improve the thickness to a value equal to or more than a thickness obtained by multiplying the inverse of a multiplying factor of the surface area of the mold (multiplying factor of the surface area of the 3-D molding surface to an area of a flat sheet on which the 3-D molding surface is projected) by the thickness of the original sheet.

SUMMARY OF THE INVENTION

It is an object of the present invention to provide a process and an apparatus for molding a 3-D molded product, which allow the thickness of the 3-D molded product formed from a sheet or the thickness of a convex top and side parts to be assured.

The process of the present invention involves molding a 3-D molded product from a sheet. The molded product includes a product section, which turns out to be a product, and an extra product section, which is to be excised. The sheet is made of a thermoplastic polymeric material. The process comprises the steps of clamping the sheet at its peripheral edge; heating and softening the sheet; deforming the heated and softened sheet by stretching the sheet along a 3-D molding surface of a mold; and adhering the sheet to the 3-D molding surface to mold the 3-D molded product. A thickness of the product section is made up by moving the sheet material at the extra product section to the product section during the deforming step by partially releasing (loosing) a tensile stress of the extra product section.

The method for partially releasing the tensile stress of the extra product section is not specifically limited and the following modes (1) and (2) may be adopted, for example.

(1) A cutting section, such as a cut, a hole, or a cutout is created on a sheet region, which turns out to be the extra product section, before or during the deformation. As shown in FIGS. 19A–19J, the shape of the cutting section (51) is not specifically limited. The cut may be a straight line or a curve, the hole may be a circle, an oval, or an oblong shape and the cutout may be V-shaped or U-shaped, as shown in FIGS. 19A–19J, in order from the top. Circular holes may be created at the edges of the cut, as shown in FIG. 19I. Or the cutting section may be intermittent, as shown in FIG. 19J. The cutting section from which a sharp edge is removed like the circular, elliptical and U-shape cutting sections and ones in which circular holes are created at the ends of the cut prevent the sheet from breaking unnecessarily at the edge. The cutting section may be created manually or by a cutting mechanism.

(2) A peripheral edge of a sheet region, which turns out to be the extra product section, has not been clamped before or during the deformation.

Although the mold is not specifically limited, a vacuum-mold and a compressed air-mold may be adopted, for example. When a vacuum-mold is used, it is preferable that the sheet is suctioned from a part of the 3-D molding surface corresponding to the product section so as the sheet to be adhered to the part, and that the sheet is not suctioned from a part of the 3-D molding surface corresponding to a sheet missing part, which is created after moving the sheet material at the extra product section during the adhering step.

Preferably, the sheet is deformed while being elongated along the 3-D molding surface by being pressed into the mold by a plug. Preferably, the plug is formed such that a gap between the plug and the 3-D molding surface after the sheet is pressed ranges from a value approximately equal to a thickness of the sheet after being pressed, which is thinner than that before being pressed, to a value 3 mm greater than a thickness of the sheet before being pressed. However, it is possible for the gap to be larger than that range at exceptional regions, such as the vertical region and the undercut region.

Another aspect of the present invention is an apparatus for molding a 3-D molded product from a sheet. The molded product includes a product section, which turns out to be a product, and an extra product section, which is to be excised. The sheet is made of a thermoplastic polymeric material. The apparatus comprises a clamp mechanism for clamping the sheet at its peripheral edge; a mold having a concave 3-D molding surface; and a plug for deforming the sheet while elongating the sheet along the 3-D molding surface by pressing the sheet into the mold. The mold or the plug is provided with a cutting mechanism for creating a cutting section at a sheet region, which turns out to be the extra product section, before or during the deformation.

Still another aspect of the present invention is an apparatus for molding a 3-D molded product from a sheet. The molded product includes a product section, which turns out to be a product, and an extra product section, which is to be excised. The sheet is made of a thermoplastic polymeric material. The apparatus comprises a clamp mechanism for clamping the sheet at its peripheral edge; a mold having a concave 3-D molding surface; and a plug for deforming the sheet while elongating the sheet along the 3-D molding surface by pressing the sheet into the mold. The clamp mechanism is arranged so that a peripheral edge of a sheet region, which turns out to be said extra product section, has not been clamped before or during the deformation.

When the mold is a vacuum-mold in the above respective apparatus, it is preferable that the vacuum suction pores are created at a part of the 3-D molding surface corresponding to the product section and that no vacuum suction pores are created at a part of the 3-D molding surface corresponding to a sheet missing part, which is created after moving the sheet material at the extra product section.

In the same manner, when the mold is a vacuum-mold, it is preferable that the mold or the plug is provided with a sealing member for preventing a vacuum leak from a sheet missing part, which is created after moving the sheet material at the extra product section. The sealing member may be a plate-like, bar-like, or ring-like sealing member made of heat resistant rubber foam or resin foam.

The vacuum-mold is not specifically limited and the following molds (a) to (f) are examples.

(a) A mold manufactured by a process which comprises electro-forming a main body of the mold on the surface of a mandrel having an electrically conductive layer having a plurality of very small, non-conductive portions on its surface so that very small, undeposited portions may be formed on the non-conductive portions at the beginning of the electro-forming operation, and may grow with the progress of the operation to eventually form a plurality of pores through the wall of the main body of the mold, as disclosed in Japanese Patent Publication No. 2-14434.

(b) A mold manufactured by a process which comprises electro-forming a main body of the mold on the surface of a mandrel having an electrically conductive layer having no very small, non-conductive portions on its surface in an electro-forming solution containing less than a substantial amount of the surface active agent so that very small, undeposited portions may be formed on the surface of the electrically conductive layer at the beginning of the electro-forming operation, and may grow with the progress of the operation to eventually form pores through the wall of the main body of the mold, as disclosed in Japanese Patent Publication No. 5-39698.

(c) A mold manufactured by a process which comprises electro-forming an electro-formed shell on the electrically conductive surface of a mandrel having very small pores of a diameter of 30 to 1000 µm on its electrically conductive surface in an electro-forming solution containing less than a substantial amount of the surface active agent so that undeposited portions may be formed on the openings of the very small pores in the beginning of the electro-forming operation, and may grow with the progress of the operation to eventually form pores through the wall of the electro-formed shell, as disclosed in Japanese Patent Laid-Open Specification No. 5-156486.

(d) A mold manufactured by a process comprising the steps of preparing a mandrel having an electrically conductive surface; forming a poreless first electro-formed layer on the conductive surface in an electro-forming solution containing a substantial amount of a surface active agent to form the front side of a shell; removing the mandrel and the layer from the solution; forming through the layer, small straight pores, each having an approximately equal diameter along a length thereof; and forming a second electro-formed layer on a back side of the first layer in an electro-forming solution containing less than a substantial amount of a surface active agent to form a back side of the shell, while undeposited hollow portions are formed in alignment with the straight pores in initial formation of the second layer, the hollow portions enlarging to form diametrically enlarged pores through the second layer, the enlarged pores having a diameter, which becomes larger toward a surface of the second layer opposite from the first layer, as disclosed in U.S. Pat. No. 5,728,284.

(e) A permeable porous mold manufactured by flame-coating melted metal drops.

(f) A mold manufactured by creating pores on the mold which has had no permeability by means of mechanical work (drill or the like), laser works and others.

Although the material of the thermoplastic polymeric material for the sheet is not specifically limited, the following materials may be used, for example:

(i) Thermoplastic synthetic resin, including polyvinyl chloride, polyvinylidene chloride, polyethylene, polypropylene, saturated polyether, polyamide, vinyl acetate copolymer, and the like, for example.

(ii) Thermoplastic elastomer (TPE) including polyolefine (TPO), polyurethane (TPU), and stylene elastomers, for example.

Further objects of this invention will become evident upon an understanding of the illustrative embodiments described below. Various advantages not specifically referred to herein but within the scope of the instant invention will occur to one skilled in the art upon practice of the presently disclosed invention. The following examples and embodiments are illustrative and not seen to limit the scope of the invention.

BRIEF DESCRIPTION OF THE DRAWINGS

FIG. 2 is a section view taken along a line II—II in FIG. 1;

FIG. 6 is a perspective view of a molding apparatus used in the first embodiment;

FIGS. 7A–7C are section views showing a molding process of the first embodiment in a series of processing steps;

FIGS. 8A–8B are plan views showing a sheet and its corresponding 3-D molded product of Example 1 of the first embodiment;

FIGS. 12A–12C are section views showing a molding process of Example 1 of a second embodiment in a series of processing steps;

FIGS. 14A–14C are section views showing a molding process of Example 3 of the second embodiment in a series of processing steps;

FIGS. 15A–15C are section views showing a molding process of Example 4 of the second embodiment in a series of processing steps;

FIGS. 16A–16C are section views showing a molding process of Example 5 of the second embodiment in a series of processing steps;

FIGS. 18A–18B are plan views showing a sheet and its corresponding 3-D molded product according to the third embodiment;

DETAILED DESCRIPTION OF THE CURRENTLY PREFERRED EMBODIMENTS OF THE PRESENT INVENTION

First to third embodiments in which the present invention is embodied in vacuum-molding an instrument panel skin will be explained below based on the drawings.

Figure 1:
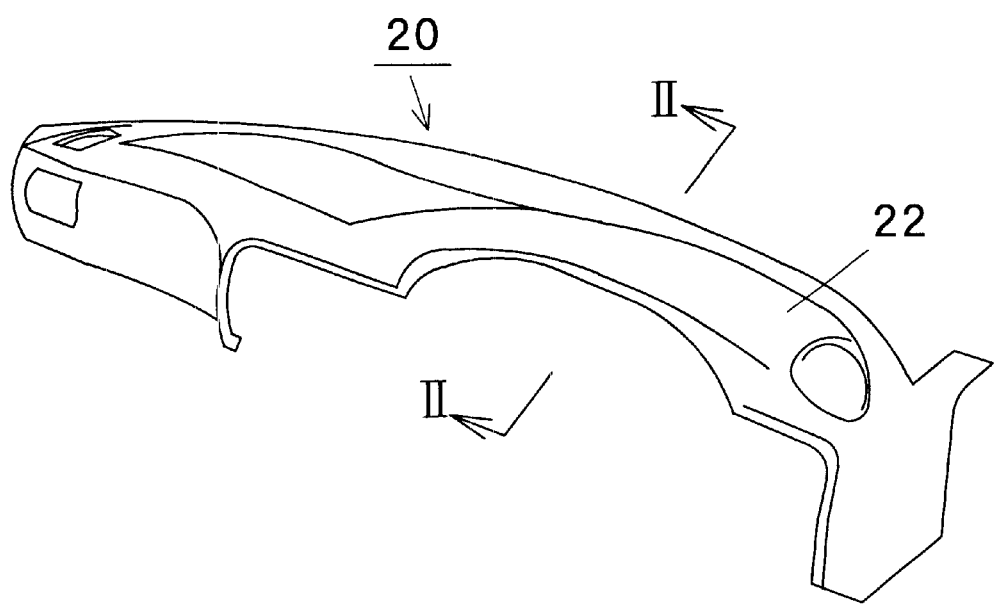
FIG. 1 is a perspective view showing an instrument panel skin of an automobile formed according to the present invention.

FIG. 1 shows an instrument panel skin 20 and FIG. 2 is a section view of a meter hood part 22 of the skin 20. Only the meter hood part 22 of the skin 20 is molded in the first to third embodiments without molding the entire instrument panel skin 20 (though it is of course possible to mold the entire instrument panel skin 20).

FIGS. 3 to 11 show a first embodiment.

Figure 3:
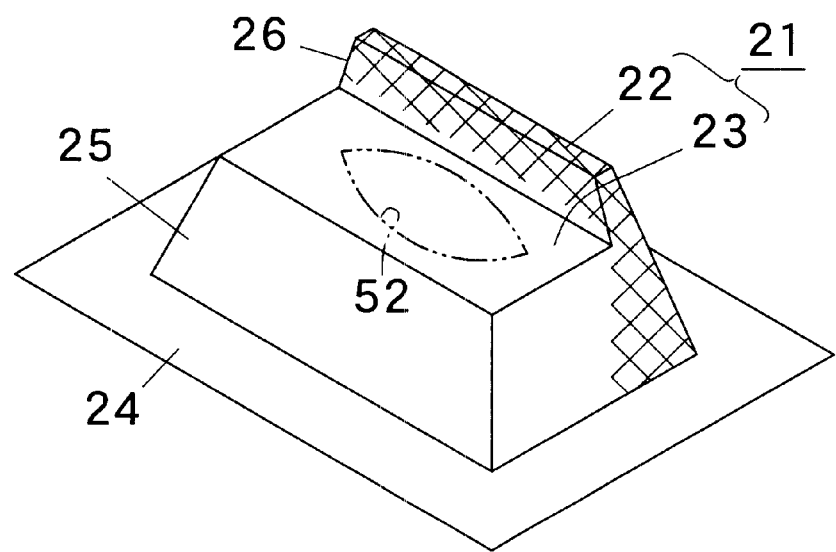
FIG. 3 is a perspective view showing a product section (meter hood part) of the instrument panel skin molded according to a first embodiment of the present invention.
Figure 4:
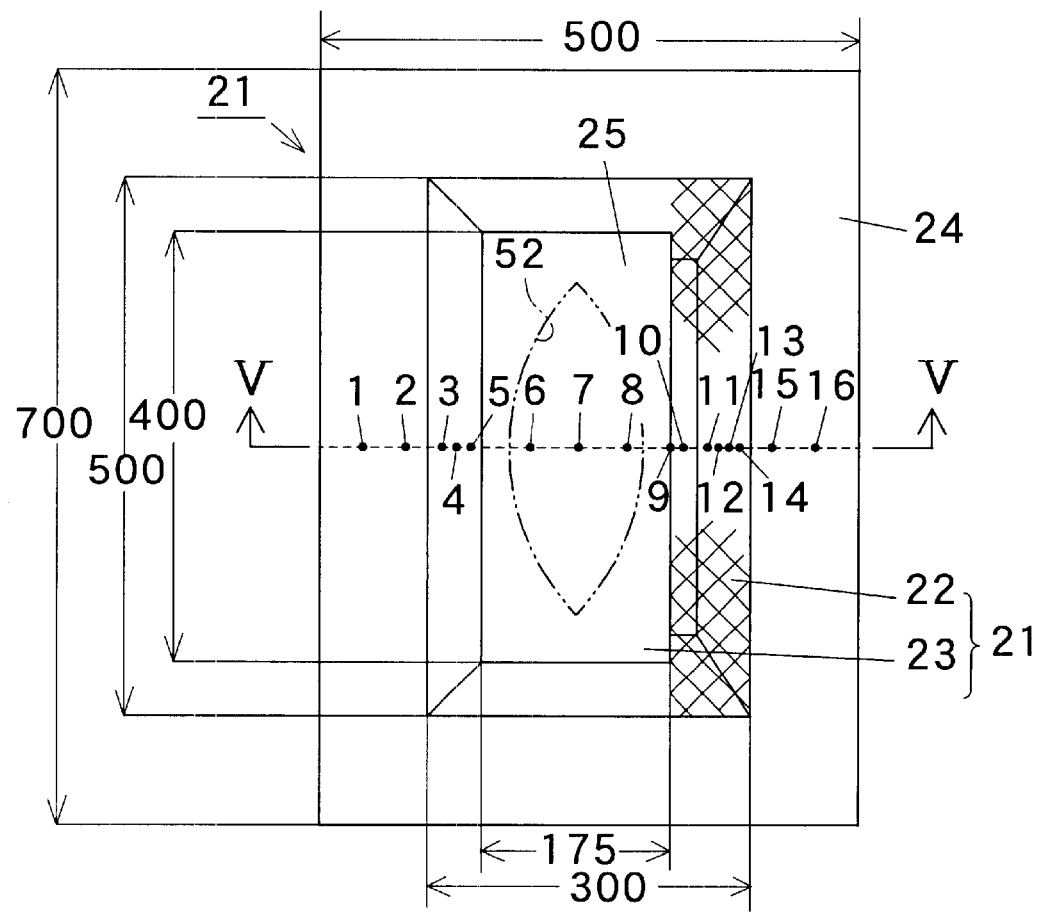
FIG. 4 is a plan view of FIG. 3.
Figure 5:
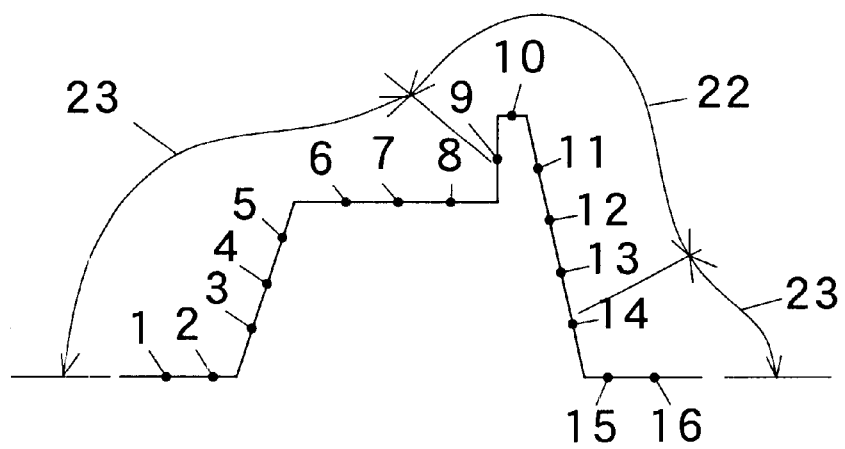
FIG. 5 is a section view taken along a line V—V in FIG. 4.

FIGS. 3 to 5 show a 3-D molded product 21 molded in vacuum of the present embodiment. The 3-D molded product 21 comprises a product section (meter hood part) 22, which is cross-hatched and turns out to be a product, and an extra product section 23, which is not cross-hatched and is excised. FIG. 4 shows the 3-D molded product 21 with dimension in unit of mm. The 3-D molded product 21 has a flange portion 24 at the peripheral part; a lower convex portion 25 at the center; and a higher convex portion 26, which extends from the right side slope of the lower convex portion 25 and protrudes vertically upwards. The part from the higher convex portion 26 to the right side of the lower convex portion 25 turns out to be the product section 22.

A molding apparatus used in the present embodiment comprises a vacuum-mold 30 and a plug 40, as shown in FIGS. 6 and 7A–7C.

The vacuum-mold 30 comprises a shell-shaped mold 31, a support frame 37 for supporting the peripheral edge portion of the shell-shaped mold 31 and a base 38 to which the support frame 37 is attached. A backup member and a temperature adjusting tube (not shown) are disposed, as necessary, at the back of the shell-shaped mold 31. A 3-D molding surface 32 of the shell-shaped mold 31 comprises a land portion 33 for molding the flange portion 24, a shallow concave portion 34 for molding the lower convex portion 25, and a deep concave portion 35 for molding the higher convex portion 26. The shell-shaped mold 31 is an electro-formed shell body made of nickel alloy manufactured by either method of (a) to (d) described in "SUMMARY OF THE INVENTION". No vacuum suction pore is created at the bottom of the shallow concave portion 34 (the part corresponding to a sheet missing part 52 (see FIGS. 3 and 4) of the extra product section 23, which is created after moving the sheet material as described later) in the 3-D molding surface 32, while vacuum suction pores 36 are created at the remaining part (including the part corresponding to the product section 22 as a matter of course). The vacuum suction pore 36 is formed so that the inner diameter thereof is very small on the side of the 3-D molding surface 32 and expands on the back. Accordingly, although the vacuum suction pores 36 are shown by dots on the 3-D molding surface 32 in FIG. 6, the vacuum suction pores 36 are invisible unless approaching closely to them. It is noted that a crimp pattern is created on the 3-D molding surface 32.

The plug 40 is formed into a convex shape approximately analogous to the concave shape of the 3-D molding surface 32 so that a gap between it and the 3-D molding surface 32 turns out to be about 1 mm across the whole surface after being pressed.

By the way, the 3-D molded product is molded in vacuum by the following method in the present embodiment.

Figure 9A:
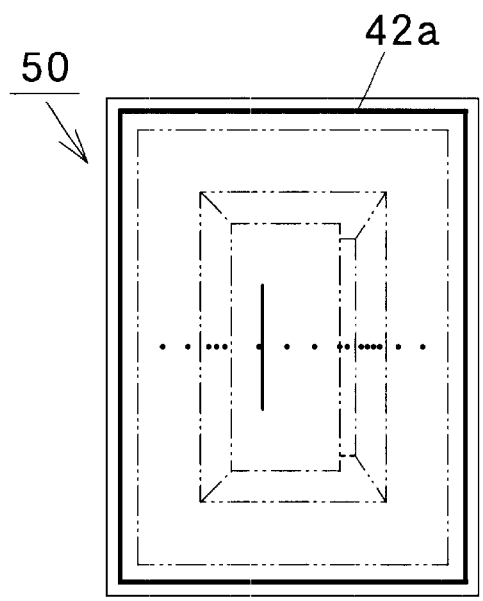
FIGS. 9A–9B are plan views showing a sheet and its corresponding 3-D molded product of Example 2 of the first embodiment.
Figure 9B:
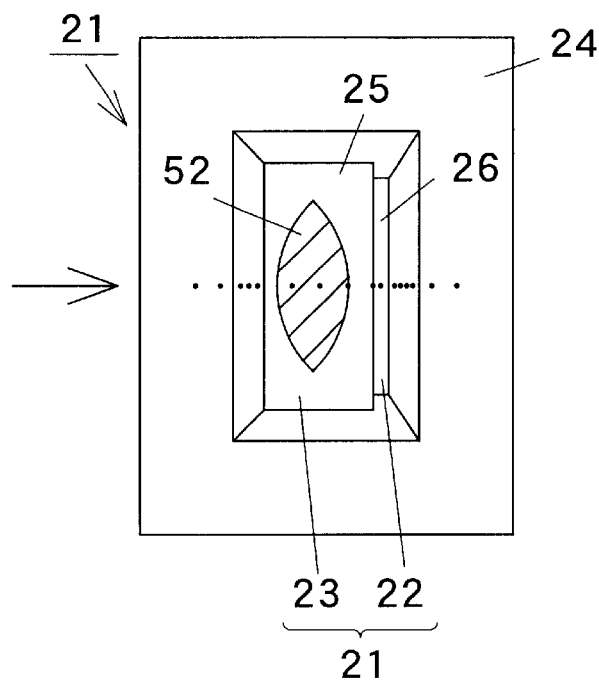

(1) Clamp a sheet 50 of 1 mm thick, for example, thermoplastic polymeric material by a clamp mechanism 42 approximately around the whole peripheral edge thereof, as shown in FIG. 7A as well as in FIG. 8A or 9A (clamping step). A thick line 42a in FIGS. 8A and 9A indicates the clamping position.

A cut 51 as a cutting section is created manually at the region of the sheet, which turns out to be the extra product section 23, before or after the clamping step in order to partially release a tensile stress of the extra product section 23 during the next deforming step. Cuts 51 of about 200 mm of length are created at the sheet region, which turns out to be the upper surface of the lower convex portion 25, and the sheet region, which turns out to be the flange portion 24 on the side of the product section 22, in Example 1 shown in FIGS. 8A and 8B. A cut 51 of about 200 mm of length is created only at the sheet region, which turns out to be the upper surface of the lower convex portion 25, in Example 2 shown in FIGS. 9A and 9B.

(2) Deform the sheet 50 heated and softened by a heater (not shown) while elongating the sheet 50 along the 3-D molding surface 32 by pressing the sheet 50 into the vacuum-mold 30 by the plug 40, as shown in FIG. 7B (deforming step).

At this time, the sheet 50 is inevitably thinned and the convex top portion and its side portion of the product section 22 are liable to be thinned. However, the cut 51 opens and partially releases a tensile stress of the extra product section 23 in this embodiment. Then, the sheet material at the extra product section 23 moves to the product section 22 and makes up for the thickness of the convex top and side parts of the product section 22, which are liable to be thinned.

(3) Adhere the sheet 50 to the 3-D molding surface 32 to mold the 3-D molded product by suctioning the sheet 50 from the vacuum suction pore 36 by reducing the pressure within the vacuum-mold 30 by a vacuum pump (not shown) as shown in FIG. 7C (adhering step). The crimp pattern created on the 3-D molding surface 32 is transferred to the surface of the 3-D molded product (not shown).

At this time, although the sheet 50 is suctioned from the part of the 3-D molding surface 32 corresponding at least to the product section 22 so as the sheet 50 to be adhered to that part, no vacuum suction is effected because no suction pores are created on the bottom part of the shallow concave portion 34 (the part corresponding to the sheet missing part 52, which is formed after moving the sheet material at the extra product section 23) as described above. Accordingly, the whole vacuum suction force is not weakened by suctioning useless air from the sheet missing part 52.

Further, because the gap between the plug 40 and the 3-D molding surface 32 is set at about 1 mm (which is approximately equal to the thickness of the sheet before being pressed and is slightly greater than the thickness of the sheet after being pressed) after he sheet is pressed as described above, the sheet 50 closely contacts to the 3-D molding surface 32 and may be readily suctioned. Thus, the vacuum (reduced pressure) seal is attained by the adhesion of the sheet 50.

Further, it is possible to reliably prevent a vacuum leak from the sheet missing part 52 by providing a sealing member 41 made of heat resistant rubber foam or resin foam on the vacuum mold 30 or the plug 40 and by applying the sealing member 41 to the sheet region around the sheet missing part 52 or to the plug 40 via the sheet missing part 52, as indicated by a two-dot chain line in FIG. 7A.

(4) Complete the meter hood part 22 by detaching the molded 3-D molded product 21 shown in FIG. 3 and by cutting the extra product section 23 from the product section (meter hood part) 22.

Figures 10A, 10B:
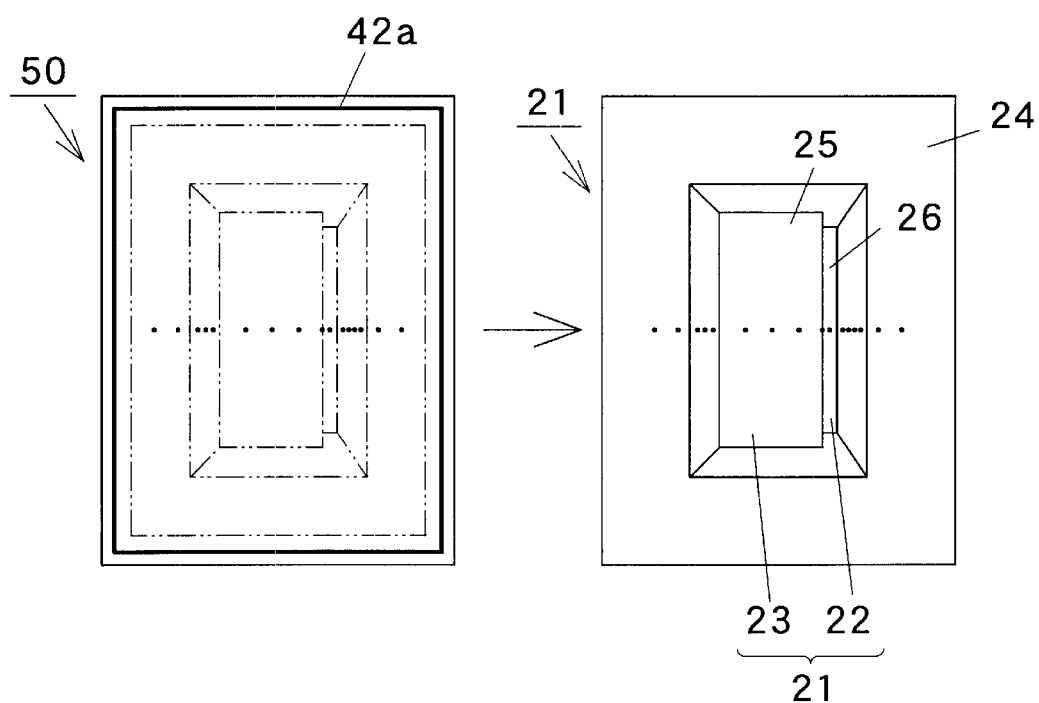
FIGS. 10A–10B are plan views of a sheet and its corresponding 3-D molded product of the Comparative Example.
Figure 11:
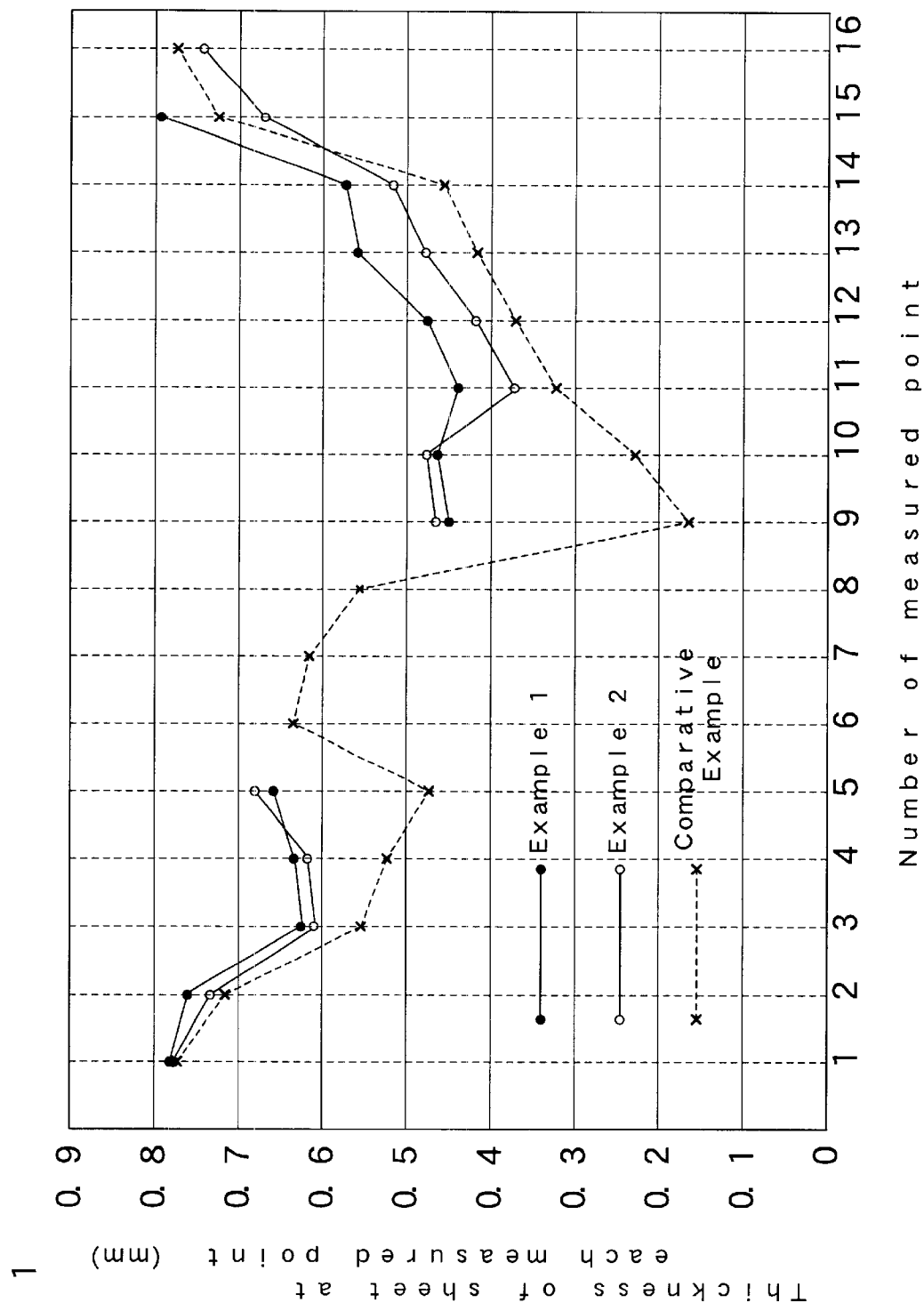
FIG. 11 is a graph showing the measuring result of the thickness in the respective 3-D molded products of Examples 1 and 2 and the Comparative Example.

FIG. 11 shows the measuring result of the thickness of the 3-D molded product 21 at points 1 to 16 shown in FIGS. 4 and 5 in Examples 1 and 2 before eliminating the extra product section 23. The thickness of the original sheet is 1 mm as described above. FIG. 11 also shows a Comparative Example in which no cut is created on the sheet 50 as shown in FIGS. 10A and 10B by measuring the thickness of the 3-D molded product 21 in the same manner. There are no measured values at points 6, 7 and 8 of Examples 1 and 2 and at point 16 of Example 1 in FIG. 11 because those points correspond just to the sheet missing part 52 described above.

As is apparent from FIG. 11, the thickness of the points 9 and 10 which correspond to the convex top part (the region there the sheet is molded in vacuum by being pressed into the deep concave portion 35 of the 3-D molding surface 32) of the 3-D molded product 21 and the side part thereof is thinned very much to around 0.2 mm in the Comparative Example. To the contrary, the thickness of the points 9, 10 and 11 which correspond to the convex top and side parts of the product section 22 is not thinned so much in Examples 1 and 2 and stays around 0.35 to 0.5 mm. That is, the required thickness is assured. Therefore, the color, feel, strength and other attributes of the convex top part and its side part do not differ so much from the other parts and are almost uniform in Examples 1 and 2. It is also possible to improve the thickness to a value equal to or more than a thickness obtained by multiplying the inverse of a multiplying factor of the surface area of the mold by the thickness of the original sheet, depending on its design. "The multiplying factor of the surface area of the mold" means the multiplying factor of the surface area of the 3-D molding surface to an area of a flat sheet on which the 3-D molding surface is projected, as was described in the above "BACKGROUND OF THE INVENTION".

FIGS. 12A to 16C show the second embodiment, which is different from the first embodiment in that a cutting mechanism 60 for creating the cut 51 on the sheet region, which turns out to be the extra product section 23, before or during the deformation described above is provided in the plug 40. The cutting mechanism 60 comprises a cutting blade 61 and an electromagnetic, hydraulic or spring type driving unit 62 for elevating the cutting blade 61. The cutting blade 61 includes a needle in its meaning.

In Example 1 shown in FIGS. 12A–12C, the cutting mechanism 60 is built in the plug 40 and is arranged so that the cutting blade 61 retreats during the clamping step shown in FIG. 12A, the cutting blade 61 drops to create the cut 51 automatically on the sheet region, which turns out to be the extra product section 23, during the deforming step shown in FIG. 12B, and the cutting blade 61 retreats during the adhering step shown in FIG. 12C.

Figures 13A, 13B, 13C:
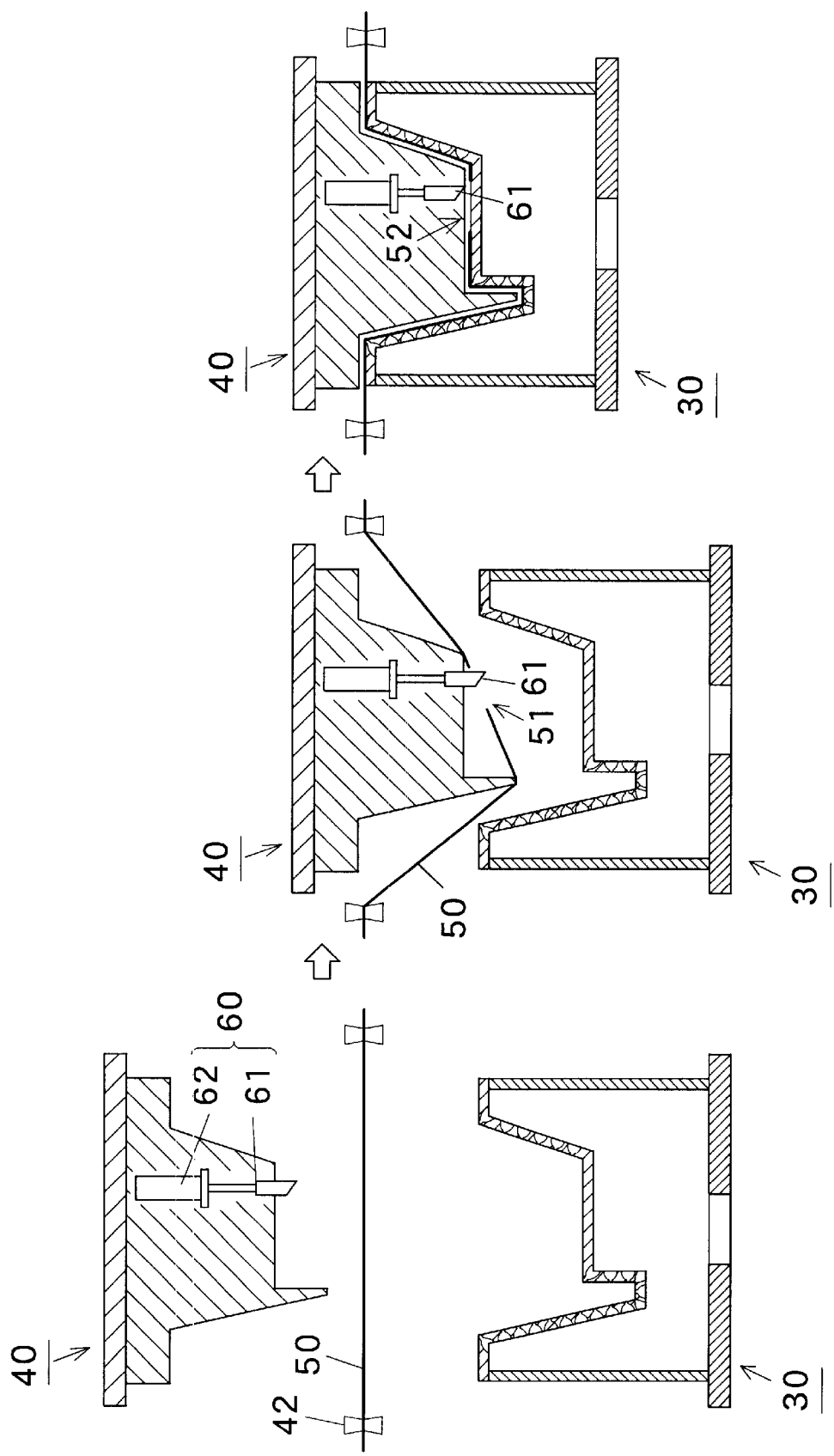
FIGS. 13A–13C are section views showing a molding process of Example 2 of the second embodiment in a series of processing steps.

In Example 2 shown in FIGS. 13A–13C, the cutting mechanism 60 is built in the plug 40 and is arranged so that the cutting blade 61 drops already during the clamping step shown in FIG. 13A, the cutting blade 61 creates the cut 51 automatically on the sheet region, which turns out to be the extra product section 23, during the deforming step shown in FIG. 13B, and the cutting blade 61 retreats during the adhering step shown in FIG. 13C.

In Example 3 shown in FIGS. 14A–14C, a receiving jig 39 for receiving the cutting blade 61 is provided so as to be able to elevate and drop on the side of the vacuum mold 30 in addition to Example 1 in FIGS. 12A–12C so that the cut 51 can be created readily by pinching the sheet 50 by the cutting blade 61 and the receiving jib 39 when the cutting blade 61 drops during the deforming step shown in FIG. 14B.

In Example 4 shown in FIGS. 15A–15C, the cutting mechanism 60 is provided on the outside of the plug 40 with respect to Examples 1 to 3.

In Example 5 shown in FIGS. 16A–16C, only the cutting blade 61 is provided on the side of the vacuum mold 30 as the cutting mechanism. A recess 44 for escaping the cutting blade 61 is provided on the side of the plug 40.

The third embodiment shown in FIGS. 17A–18B is different from the first embodiment in that the peripheral edge of the sheet region, which turns out to be the extra product section 23, has not been clamped before or during the deformation instead of creating the cut like the first and second embodiments (or in addition to creating the cutting section such as the cut) as a method for partially releasing a tensile stress of the extra product section 23.

Figure 17C:
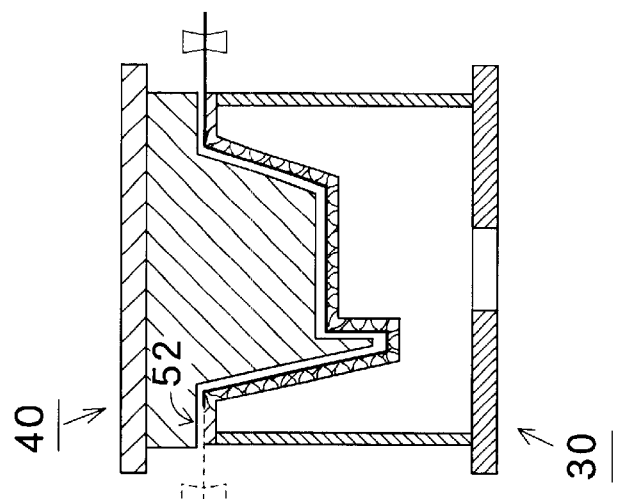
FIGS. 17A–17C are section views showing a molding process of a third embodiment in a series of processing steps.
Figure 17B:
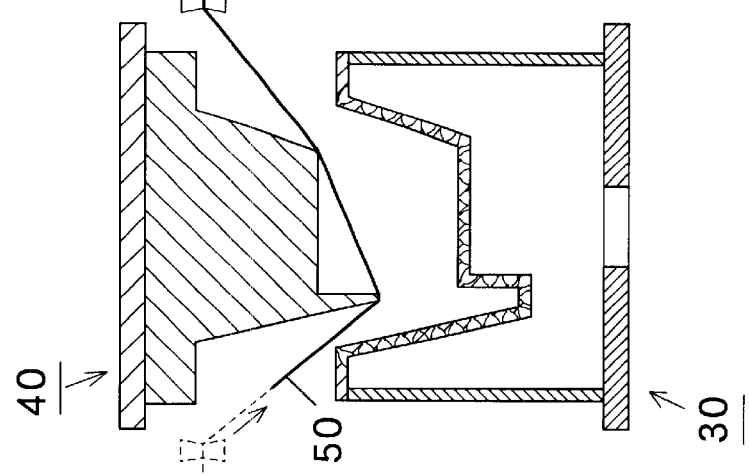
Figure 17A:
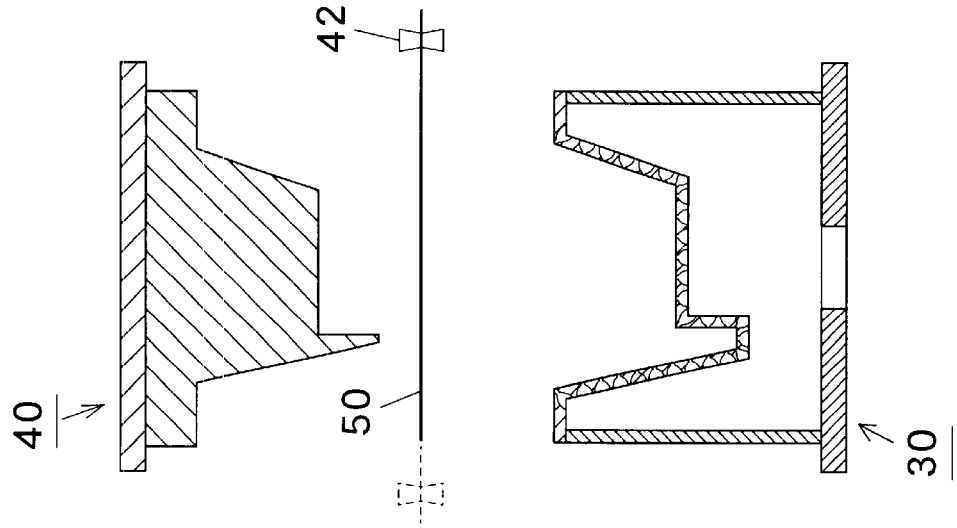
Figure 19A:
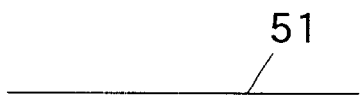
FIGS. 19A–19J are plan views showing various modes of a cutting section formed on the sheet.
Figure 19B:
Figure 19C:
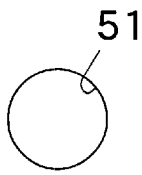
Figure 19D:
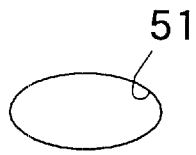
Figure 19E:
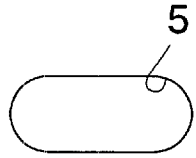
Figure 19F:
Figure 19G:
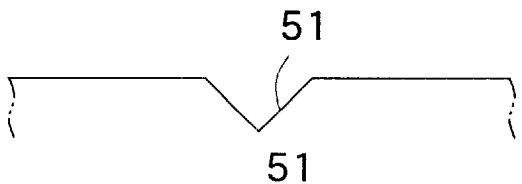
Figure 19H:
Figure 19I:
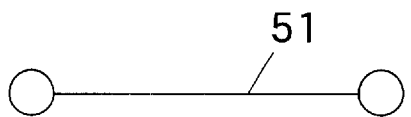
Figure 19J:
Figure 20:
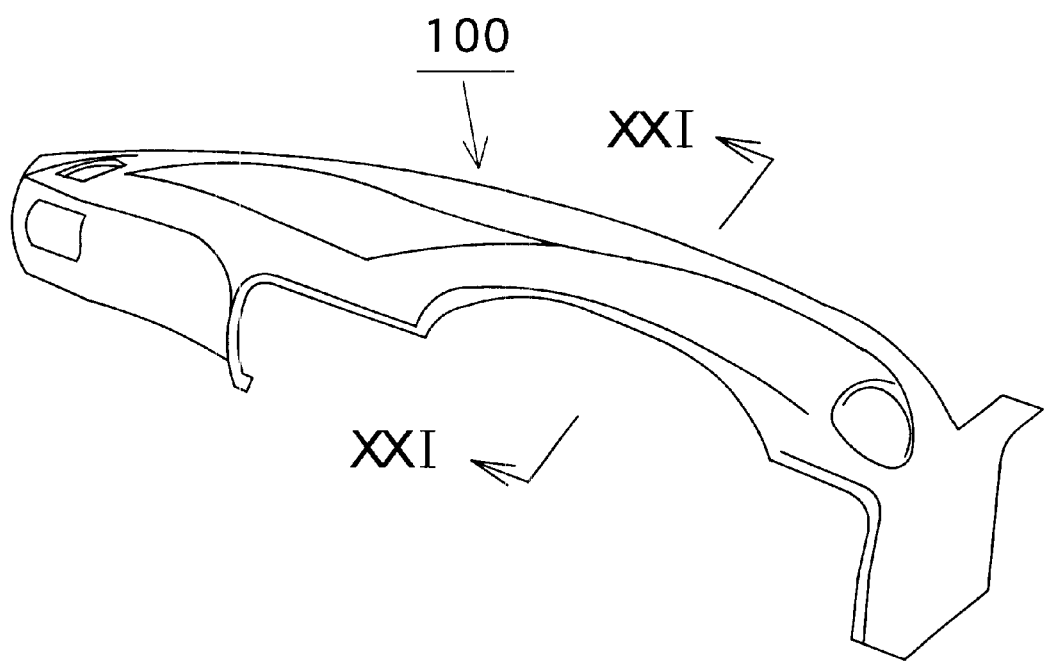
FIG. 20 is a perspective view showing a conventional instrument panel skin of an automobile.
Figure 21:
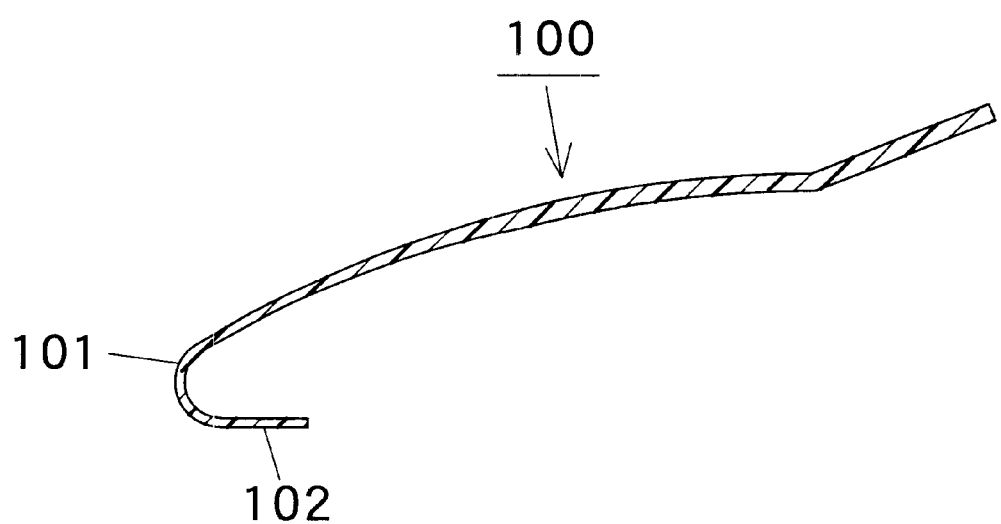
FIG. 21 is a section view taken along a line XXI—XXI in FIG. 20.

That is, as the clamping position is indicated by a thick line 42a in FIG. 18A, the peripheral edge portion 42b of the sheet region, which turns out to be the product section 22, is not clamped and the remaining peripheral edge is clamped by the clamping mechanism 42. According to the present embodiment, although the sheet 50 causes no specific change during the clamping step shown in FIG. 17A, the peripheral edge of the sheet region not clamped enters the inside during the deforming step shown in FIG. 17B, and the tensile stress of the extra product section 23 is partially lost. Thus, the entered sheet material moves to the product section 22 and makes up for the thickness of the product section 22. After the peripheral edge of the sheet region not clamped moves, a sheet missing part 52 is created, as shown in FIG. 18B. FIG. 17C, the adhering step, is the same with the first embodiment.

The same operation and effect with the first embodiment can be obtained by the second and third embodiments.

As many apparently widely different embodiments of this invention may be made without departing from the spirit and scope thereof, it is to be understood that the invention is not limited to the specific embodiments thereof except as defined in the appended claims.

What is claimed is:

1. A process for molding a three-dimensional molded product from a sheet, said molded product including a product section, which turns out to be a product, and an extra product section, which is to be excised, and said sheet being made of a thermoplastic polymeric material, said process comprising:

clamping said sheet at its peripheral edge;

heating and softening said sheet;

deforming said heated and softened sheet by stretching said sheet along a three-dimensional molding surface of a mold;

adhering said sheet to said three-dimensional molding surface to mold said three-dimensional molded product, wherein a thickness of said product section is made up by moving the sheet material at said extra product section to said product section during said deforming step by partially releasing a tensile stress of said extra product section; and wherein partially releasing said tensile stress of said extra product section is to create a cutting section, wherein said cutting section is one of a cut, a hole, and a cutout on a sheet region, which turns out to be said extra product section, before or during said deformation.

2. The process as set forth in claim 1, wherein said cutting section is created manually or by a cutting mechanism.

3. A process for molding a three-dimensional molded product from a sheet, said molded product including a product section, which turns out to be a product, and an extra product section, which is to be excised, and said sheet being made of a thermoplastic polymeric material, said process comprising:

clamping said sheet at its peripheral edge;

heating and softening said sheet;

deforming said heated and softened sheet by stretching said sheet along a three-dimensional molding surface of a mold;

adhering said sheet to said three-dimensional molding surface to mold said three-dimensional molded product, wherein a thickness of said product section is made up by moving the sheet material at said extra product section to said product section during said deforming step by partially releasing a tensile stress of said extra product section; and wherein partially releasing said tensile stress of said extra product section is that a peripheral edge of a sheet region, which turns out to be said extra product section, has not been clamped before or during said deformation.

4. A process for molding a three-dimensional molded product from a sheet, said molded product including a product section, which turns out to be a product, and an extra product section, which is to be excised, and said sheet being made of a thermoplastic polymeric material, said process comprising:

clamping said sheet at its peripheral edge;

heating and softening said sheet;

deforming said heated and softened sheet by stretching said sheet along a three-dimensional molding surface of a mold;

adhering said sheet to said three-dimensional molding surface to mold said three-dimensional molded product, wherein a thickness of said product section is made up by moving the sheet material at said extra product section to said product section during said deforming step by partially releasing a tensile stress of said extra product section; and wherein said mold is a vacuum-mold and wherein said sheet is suctioned from a part of said three-dimensional molding surface corresponding to said product section so as said sheet to be adhered to said part and said sheet is not suctioned from a part of said three-dimensional molding surface corresponding to a sheet missing part, which is created after moving said sheet material at said extra product section during said adhering step.

* * * * *